United States Patent [19]

Moridi

[11] Patent Number: 6,049,575
[45] Date of Patent: *Apr. 11, 2000

[54] DIGITAL COMMUNICATIONS SYSTEM COMPRISING A RECEIVER THAT INCLUDES A TIMING RECOVERY DEVICE

[75] Inventor: Saïd Moridi, London, United Kingdom

[73] Assignee: U.S. Philips Corporation, New York, N.Y.

[ * ] Notice: This patent is subject to a terminal disclaimer.

[21] Appl. No.: 09/132,400

[22] Filed: Aug. 11, 1998

Related U.S. Application Data

[63] Continuation of application No. 08/662,711, Jun. 10, 1996, Pat. No. 5,862,191.

[30] Foreign Application Priority Data

Jun. 28, 1995 [FR] France .................................. 95 07786

[51] Int. Cl.[7] ...................................................... H04L 7/00
[52] U.S. Cl. .......................................... 375/355; 375/340
[58] Field of Search ..................................... 375/355, 372, 375/376, 261, 240; 327/91, 95, 147, 156; 329/304

[56] References Cited

U.S. PATENT DOCUMENTS

| | | | |
|---|---|---|---|
| 4,621,366 | 11/1986 | Cain et al. .............................. | 375/222 |
| 4,669,092 | 5/1987 | Sari et al. .............................. | 375/232 |
| 4,852,090 | 7/1989 | Borth ....................................... | 375/364 |
| 5,243,630 | 9/1993 | Rhebergen .............................. | 375/355 |
| 5,276,711 | 1/1994 | Rossi ....................................... | 375/355 |
| 5,363,408 | 11/1994 | Paik et al. .............................. | 35/355 |
| 5,426,671 | 6/1995 | Bergemans .............................. | 375/354 |
| 5,671,257 | 9/1997 | Cochran et al. ........................ | 375/355 |
| 5,673,293 | 9/1997 | Scarpa et al. ........................... | 375/321 |

*Primary Examiner*—Chi H. Pham
*Assistant Examiner*—Emmanuel Bayard
*Attorney, Agent, or Firm*—Leroy Eason

[57] ABSTRACT

A digital communication system including a transmitter and a receiver and wherein transmitted digital signal samples are modulated in accordance with a first constellation of modulated signal values. The receiver includes a phase locked loop for synchronizing digital sampling at the receiver with the received signal samples. The synchronism adjustment error is formed from a pseudo-error function which is a weighted combination of first and second errors, the first error being a function of the distance between received samples and the decisions made with respect thereto in the first constellation, the second error being a function of the distance between received samples and the decisions made with respect thereto in a second simplified constellation derived from the first constellation. A weighting is assigned to the second error which may, in one embodiment, be proportional to the first error.

4 Claims, 4 Drawing Sheets

DIGITAL COMMUNICATIONS SYSTEM COMPRISING A RECEIVER THAT INCLUDES A TIMING RECOVERY DEVICE

CROSS REFERENCE TO RELATED APPLICATIONS

This is a continuation of application Ser. No. 08/662,711, filed Jun. 10, 1996, now U.S. Pat. No. 5,862,191.

BACKGROUND OF THE INVENTION

1. Field of the Invention

The invention relates to a digital communications system comprising at least a transmitter and a receiver for transmitting a signal modulated on the basis of a first constellation, said receiver, which is intended to receive samples of said signal and make decisions with respect to said samples, further including a timing recovery device of the synchronous type which includes a phase-locked loop adjusted by means of an adjustment error.

The invention also relates to a receiver for digital modulations, intended to receive samples of a signal modulated on the basis of a first constellation and make decisions with respect to said samples, which includes a timing recovery device of the synchronous type which comprises a phase-locked loop adjusted by means of an adjustment error.

The invention finds highly significant applications in the field of synchronous communications. The clocks of the transmitter and receiver are in fact to be synchronized to optimize the sampling instants of the received signal.

2. DESCRIPTION OF RELATED ART

Let us assume that $a(nt)$ are the symbols transmitted by the transmitter at the rate T, $x(nT+\tau)$ is the signal sampled by the receiver with an offset of $\tau$, and h is the total transfer function of the transmission channel. The relation between transmitted symbols and received symbols can be expressed in the following manner:

$$x(nT + \tau) = \sum_i a(iT)h[(n - i)T + \tau]$$

$$x(nT + \tau) = a(nT)h(\tau) + \sum_{i \neq n} a(iT)h[(n - i)T + \tau]$$

In addition to the desired data $a(nT)h(\tau)$, there appears an intersymbol interference term which is a function of the offset $\tau$. The error resulting therefrom in the received symbol will be used for correcting the offset $\tau$.

The article by Mueller and Müller entitled "Timing Recovery in Digital Synchronous Data Receivers", published in IEEE Transactions on Communications, Vol. 24, No. 5, May 1976, recommends to adjust the phase-locked loop by a function f derived from the channel response h and which symmetrizes the response at steady-state, that is to say, for $\tau$ verifying $f(\tau)=0$. In practice, the channel response h is not available and thus an estimate of this function is used which itself is derived from samples received by the receiver. The estimate used is, for example, given by the following expression:

$$\in_n = \text{Re}[e^*_{n-1}(d_n - d_{n-2})]$$

where

Re( ) indicates the real part of the complex number in brackets, $d_n$ is the decision made on the $n^{th}$ received sample $x_n$, $e_n = x_n - d_n$ is the corresponding error for sample $x_n$, and $e_n^*$ is the conjugate of $e_n$.

This estimate in effect leads to symmetrizing the channel response at steady-state, since $$\text{Re}[h(T+\tau) - h(-T+\tau)] = 0$$

This estimate $\in_n$ is a function of the error $e_{n-1}$ caused in sample $x_{n-1}$. However, its use as an adjustment error of the phase-locked loop of the timing recovery device of the receiver for modulations in a large number of states yields insufficient results. In effect, whereas the distance between two points of the constellation used becomes smaller when the number of states of the constellation increases, the probability of having a false decision and thus a false error estimate becomes greater.

It is an object of the invention to overcome this disadvantage.

SUMMARY OF THE INVENTION

Therefore, a communications system according to the invention and as described in the introductory paragraph is characterized in that said adjustment error is formed on the basis of a pseudo-error which is a function of a first and a second error of the phase-locked loop respectively, bearing a first and a second weighting, said first error being a function of the distance between the received samples and the decisions made with respect to the samples in said first constellation, said second error being a function of the distance between said samples and a decisions made with respect to these samples in the second, simplified constellation, and the weighting assigned to said second error being proportional to said first error.

Thus, said first error is predominant, as long as it remains below a certain value, that is to say, while it may be considered reliable. Above said value, it is the second, approximate error that is predominant and thus ensures a greater robustness of the timing recovery device. Indeed, the higher the amplitude of the correction made in the sampler, the faster will be the convergence towards the desired sampling instant. It is thus advantageous to use a correction of higher amplitude when the error exceeds the certain value.

In an embodiment which is particularly simple to use, said pseudo-error is formed from:

said first error, when said first error is lower than a given threshold, and, if not, said second error.

In another embodiment of a communications system according to the invention, the receiver comprises:

comparing means for comparing the coordinates of the received samples with the boundaries of said constellation, synchronization detection means, storage means for storing coordinates of said adjustment error, computing means for computing said adjustment error based upon the stored coordinates, check means for checking said storage means for storing a coordinate of said adjustment error only if the corresponding coordinate of the received sample is situated outside the boundaries of the first constellation, when said receiver is not synchronized.

In a first embodiment, used when the receiver is not synchronized, only the coordinates of the points for which the error sign is certain are used. This mode of operation is thus particularly robust and makes it possible to "lock in" rapidly the timing of the transmitter during the start. On the other hand, it is very noisy, because it utilizes few points and it is thus necessary to switch to a second mode of operation which utilizes all the points received from the moment the receiver is synchronized with the transmitter.

These and other aspects of the invention will be apparent from and elucidated with reference to the embodiments described hereinafter.

BRIEF DESCRIPTION OF THE DRAWINGS

For a fuller understanding of the invention, reference is had to the following description taken in connection with the following drawings, in which.

DETAILED DESCRIPTION OF THE PREFERRED EMBODIMENTS

Figure 1:
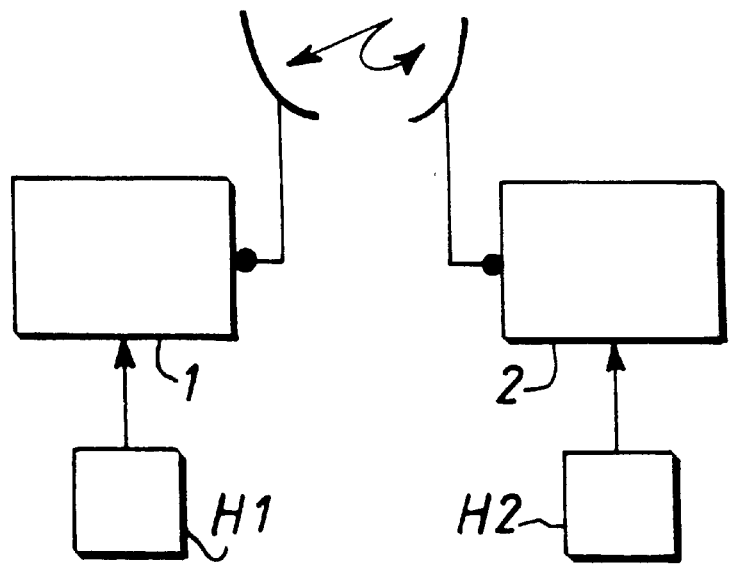
FIG. 1 represents a communications system according to the invention.

According to FIG. 1, a communications system according to the invention comprises a transmitter 1 which operates in synchronism with a first clock H1, and a receiver 2 which operates in synchronism with a second clock H2, for transmitting a signal by radio channel, for example.

Figure 2:
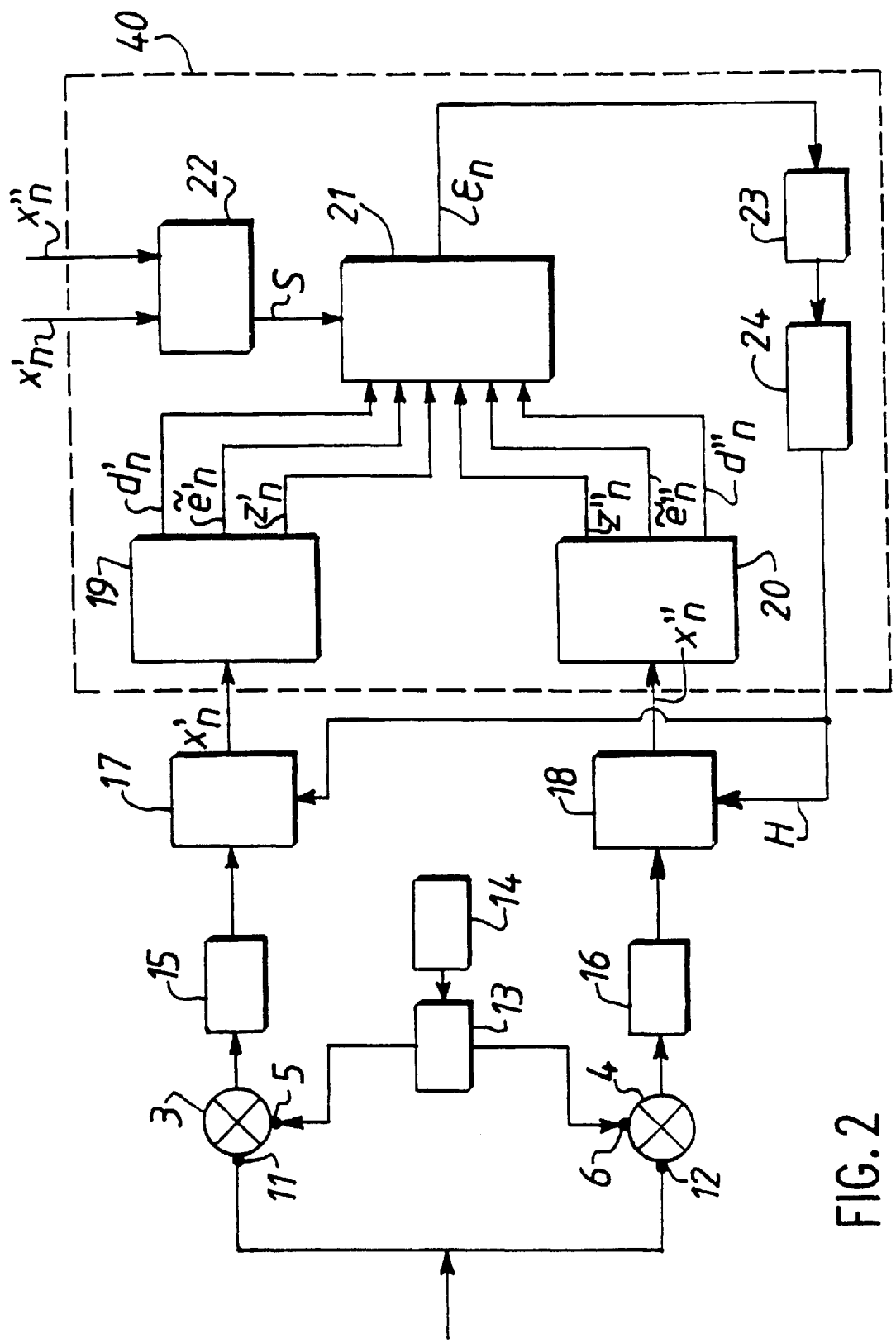
FIG. 2 represents in a diagram a receiver of such a communications system.

According to FIG. 2, the receiver 2 comprises two mixers 3 and 4. These mixers receive, on the one hand, on their first input 11 and 12, the signal received by the receiver 2 and, on the other hand, on their second input 5 and 6, quadrature signals coming from a 90° phase shifter 13 which itself receives a sine-shaped signal from a local oscillator 14. The outputs of the mixers 3 and 4 are connected to the input of a low-pass filter 15, 16, respectively. The outputs of these filters 15 and 16 are connected to an input of analog-to-digital converters 17 and 18, respectively. These analog-to-digital converters are controlled by a clock signal H produced by the timing recovery circuit 40. The converter 17 thus applies the real component $x'_n$ of sample $x_n$ to a first error computing device 19. The converter 18 applies the imaginary component $x''_n$ of sample $x_n$ to a second error computing device 20. Data $d'_n$, $\tilde{e}'_n$, $z'_n$, on the one hand, and $d''_n$, $\tilde{e}''_n$ and $z''_n$, on the other, produced at the output of the error computing devices 19 and 20, are applied to a phase comparator 21 which further receives a signal S coming from a synchronization detector 22. This phase comparator produces an adjustment error $\in_n$ which is applied to a loop filter 23 which controls a voltage-controlled oscillator 24 whose output controls the analog/digital converters 17 and 18.

Thus, the phase-locked loop PLL formed by the analog/digital converters 17, 18, the error computing devices 19 and 20, the phase comparator 21, the loop filter 23 and the voltage-controlled oscillator 24 is adjusted by the adjustment error $\in_n$ to correct the offset τ between the clocks of the transmitter 1 and of the receiver 2.

The adjustment error $\in_n$ used is expressed in the following manner:

$$\in_n = \mathrm{Re}[\tilde{e}^*_{n-1}(d_n - d_{n-2})]$$

that is $$\in_n = \tilde{e}'_{n-1}(d'_n - d'_{n-2}) + \tilde{e}''_{n-1}(d''_n - d''_{n-2})$$

with $\tilde{e}_{n-1} = \tilde{e}'_{n-1} + j.\tilde{e}''_{n-1}$ and $d_n = d'_n + j.d''_n$ where $\tilde{e}_n$ is a pseudo-error which, in the first embodiment, is equal to:

$$\tilde{e}_n = k_1 e_n + k_2 |e_n| \hat{e}_n$$

k1 and k2 being positive real values and $\hat{e}_n$ being equal to:

$$\hat{e}_n = x_n - \alpha.\mathrm{sgn}(x_n)$$

where:
sgn indicates the sign function (considering that $\mathrm{sgn}(x_n) = \mathrm{sgn}(x'_n) + j.\mathrm{sgn}(x''_n)$, $x'_n$ and $x''_n$ being respectively the real and imaginary parts of $x_n$), and α is equal to:

$$\alpha = \frac{E(|a_n|^2)}{E(|a'_n| + |a''_n|)}$$

while E( ) indicates the mathematical evalution of the expression in brackets.

The pseudo-error is a weighted sum of a first error $e_n$ and a second error $\hat{e}_n$. The first error $e_n$ is the error between the received samples $x_n$ and the decisions $d_n$ made with respect to these samples $x_n$ in the first constellation on the basis of which the signal has been modulated. The second error $\hat{e}_n$ is the error between the samples $x_n$ and the decisions made with respect to these samples in a second constellation which is simplified compared with the first constellation. The weight attributed to the second error $\hat{e}_n$ is proportional to the first error $e_n$.

Figure 3:
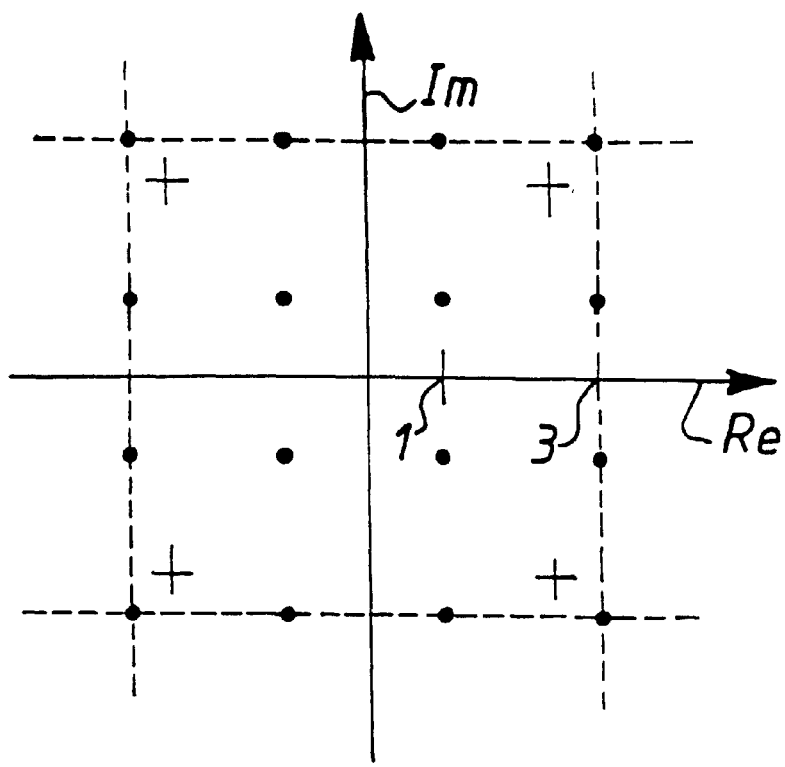
FIGS. 3 and 4 diagrams of a first 16-point constellation and a second, simplified 4-point constellation.

FIG. 3 gives a representation of these constellations. In this example, selected for the simplicity of the representation, the constellation used for modulating the signal, called first constellation, is a 16 QAM constellation. The simplified constellation having 16 points marked solid dots, of which the choice is independent of that of the first constellation, is a constellation of four coordinate points marked by crosses at (α,α) (α,−α) (−α,α) and (−α,−α) since $\mathrm{sgn}(x_n)$ can assume four different values: 1+j, 1−j, −1+j, and −1−j because $x_n$ is a complex adjustment error. When the first constellation is a 16 QAM constellation, the value of α is equal to 2.5.

Thus, the error $e_n$ is used predominantly as long as it can be considered reliable. After that, it is the error $\hat{e}_n$ that is roughly predominant.

The embodiment that has just been described relates to a simplified four-point constellation which offers the advantage of being simple. But, obviously, other types of simplified constellations are also usable.

The invention makes use of part of the article entitled "Blind Equalizers" by Albert Benveniste, published in IEEE Transactions on Communications, Vol. 32, No. 8, August 1984, which describes a use of such a pseudo-error. The pseudo-error is used there, however, for a different technique from that of the present invention: equalization.

The invention further consists of improving this method, notably by reducing the number of operations to be carried out.

Therefore, in another embodiment of the invention, the pseudo-error used is defined in the following manner:

$$\tilde{e}_n = \begin{cases} sgn\ e_n & \text{if } [|e'_n| < 1/2 \text{ and } |e''_n| < 1/2] \\ sgn\ \hat{e}_n & \text{if not} \end{cases}$$

Figure 4:
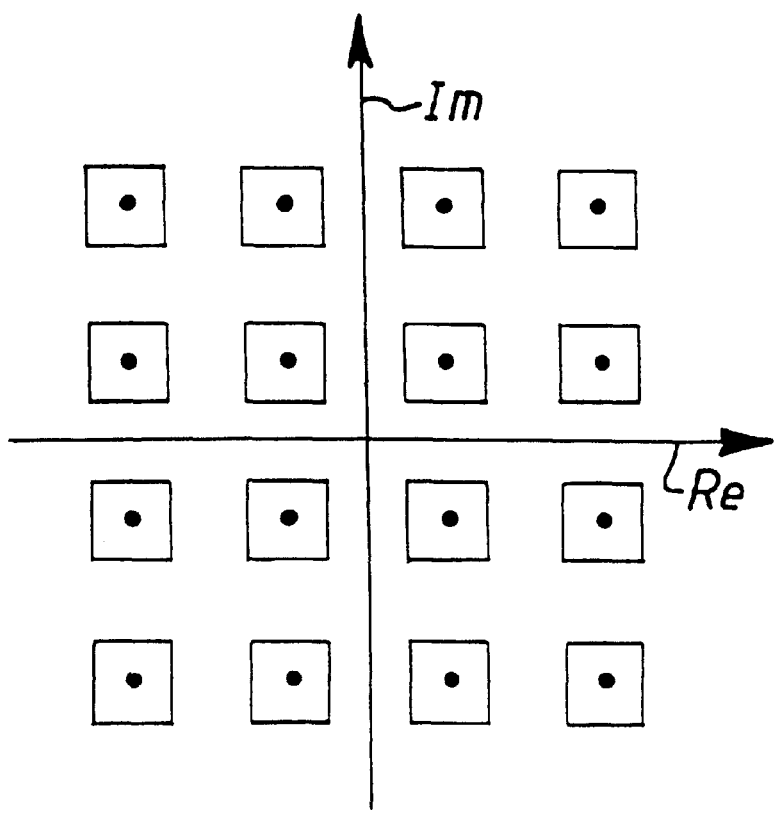

FIG. 4 represents squares of sides ½ centred at each point of the 16 QAM constellation. When sample $x_n$ is situated inside this square, the real parts and imaginary parts $e'_n$ and $e''_n$ of the error are smaller than ½ and $\tilde{e}_n$ is equal to $sgn(e_n)$. On the other hand, beyond this boundary, $\tilde{e}_n$ is equal to $sgn(\hat{e}_n)$.

The evaluation of the pseudo-error $\tilde{e}_n$ and thus of the adjustment error $\in_n$ is thus simplified. In fact, the real and imaginary parts of $\tilde{e}_{n-1}$ being represented only by a single bit, the multiplications which were necessary are left out.

Figure 5:
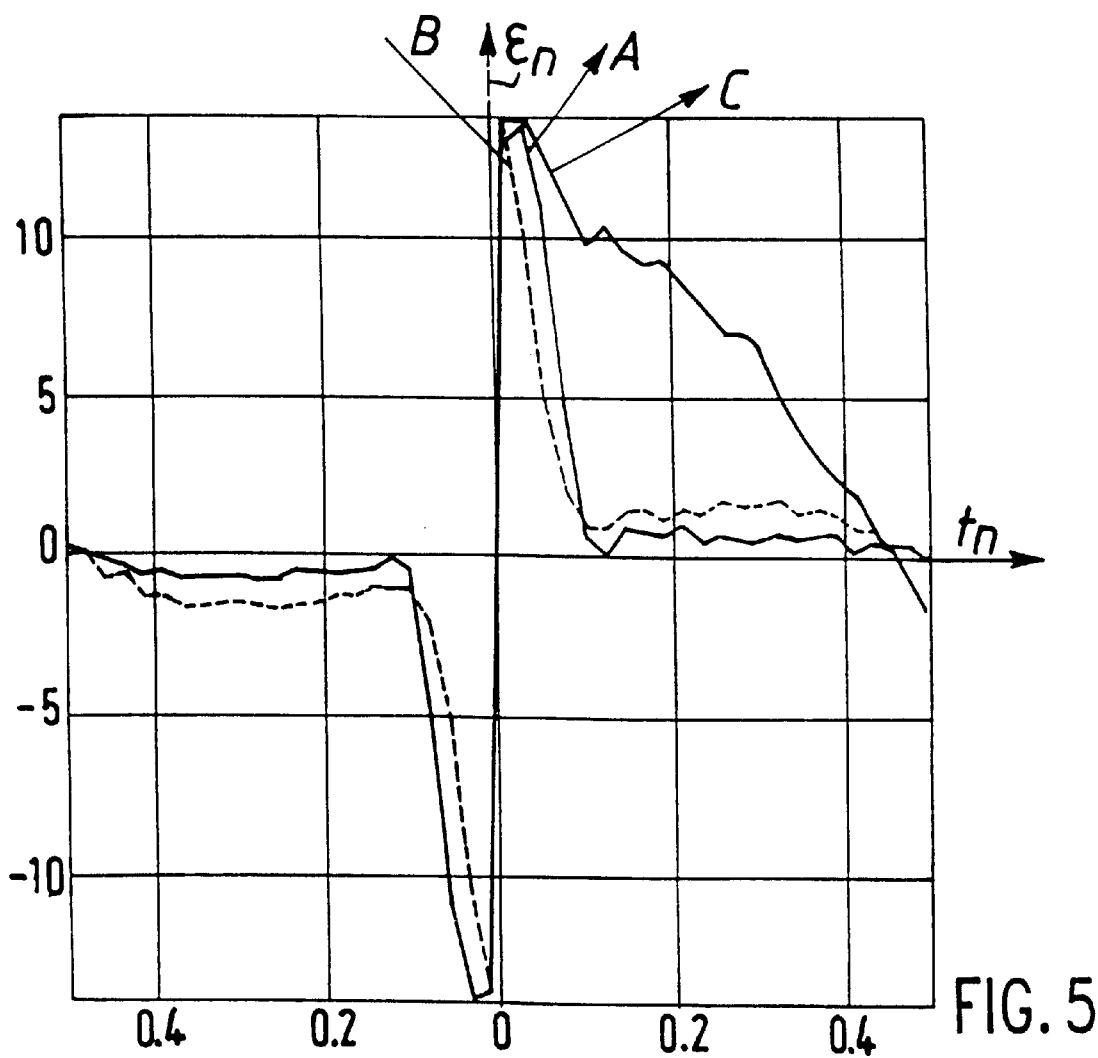
FIG. 5 represents a curve comparing the results obtained according to the state of the art and according to the various embodiments of the present invention with a 128QAM constellation.

This modification improves the characteristic of the phase comparator as is proved by the curves A and B of FIG. 5. These curves indicate along the X-axis the sampling delay $t_n$ and along the Y-axis the output of the phase comparator, that is to say, the value of the corresponding adjustment error $\in_n$. Curve A corresponds to the state of the art and curve B corresponds to the second embodiment of the present invention. The correction made to the local clock when there is a considerable delay is higher according to curve B, which makes it possible to obtain a faster convergence.

The result obtained may, however, not be sufficient in certain cases. Therefore, in a third embodiment of the invention, when starting a first phase called the locking phase is distinguished during which the clock of the receiver is not yet synchronized with that of the transmitter. To this first phase corresponds a first mode of operation. Then, once the receiver has been synchronized, a second mode of operation is proceeded to which corresponds to one of the embodiments described above. In the first mode of operation, only the coordinates of the received points for which the error is certain, that is to say, those which are situated outside the constellation, are used for the computation of the adjustment error $\in_n$.

Figure 6:
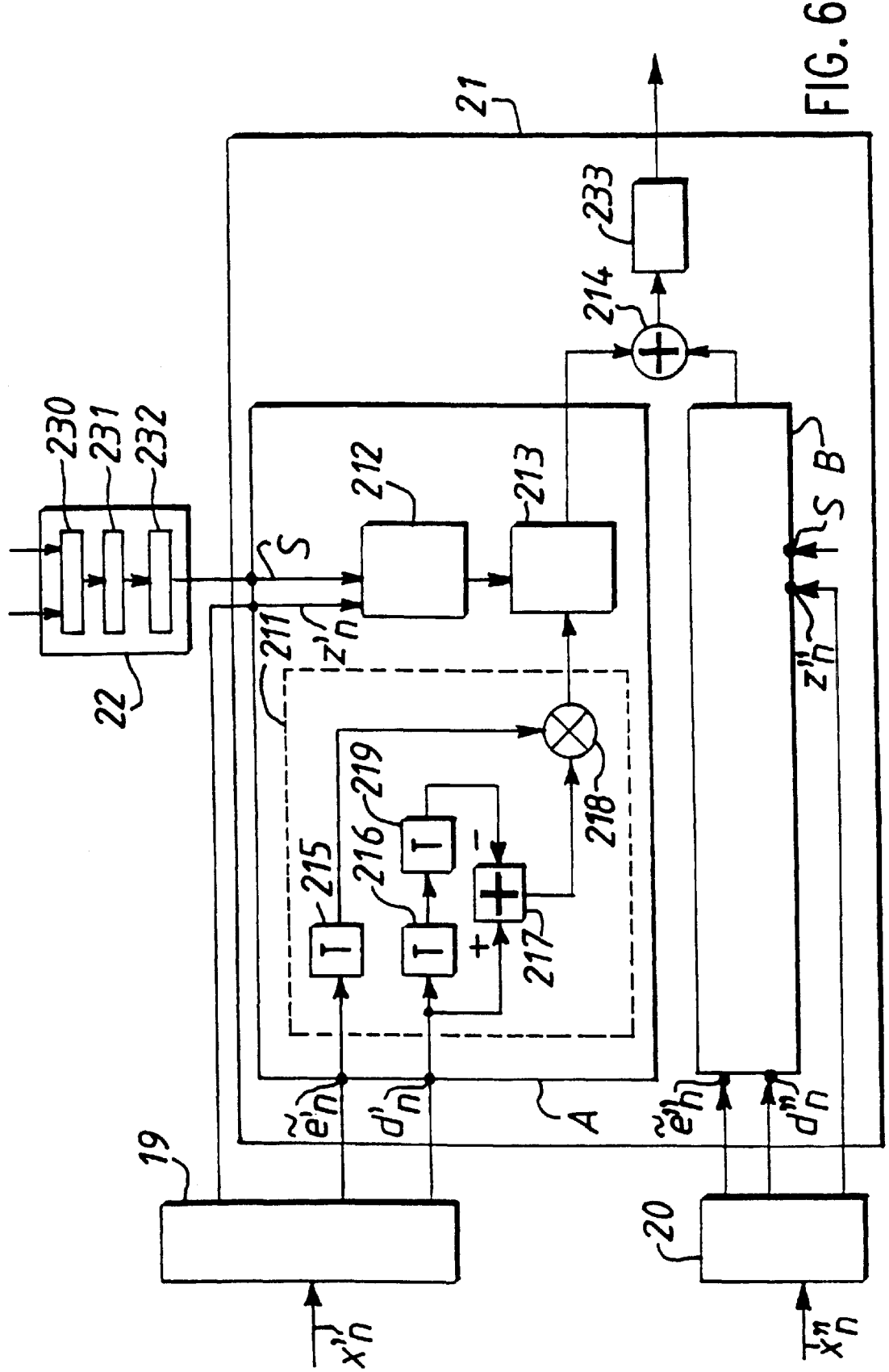
FIG. 6 shows a block diagram of a phase comparator of a system according to the invention.

FIG. 6 represents a diagram of the phase comparator 21 in this embodiment. It comprises two identical sub-assemblies A and B for processing the real part and the imaginary part of the signal, respectively. Only the sub-assembly A, which corresponds to the processing of the real part of the signal, is shown in detail in the Figure. It comprises a circuit 211 for computing the real part of the adjustment error $\in_n$, and a circuit 212 for checking a memory 213. The phase comparator further includes a circuit 214 for summing the results obtained for the real and imaginary parts. And the output of this summation circuit is transmitted to a digital/analog converter 233 which applies the resulting adjustment error $\in_n$ to the loop filter 23.

The computing circuit 211 receives on its input, on the one hand, the real part of the pseudo-error $\tilde{e}'_n$, which is applied to a first delay element 215, and on the other hand, the real part of the decision made $d'_n$, which is applied to a second delay element 216 and also to a summator 217. The first delay element 215 produces on its output the delayed pseudo-error $\tilde{e}'_{n-1}$ which is applied to a multiplier circuit 218. The second delay element 216 produces the delayed decision $d'_{n-1}$ which is applied to an input of a third delay element 219. This third delay element applies the delayed decision $d'_{n-2}$ to the summing circuit 217. The summing circuit 217 applies the sum $(d'_n-d'_{n-2})$ to the multiplier 218, and, finally, the multiplier 218 applies the real part of the adjustment error $\in_n$:

$$Re(\in_n) = \tilde{e}'_{n-1}(d'_n - d'_{n-2})$$

to the memory 213.

Storing this expression applied to the input of memory 213 depends on the indication given thereto by the check circuit 212. This check circuit 212 receives on an input a storage indicator $z'_n$ given thereto by the error computing device 19 and also a synchronization indicator S given thereto by the synchronization detector 22. The check circuit 212 sends a storage signal to the memory 213 when the signal S indicates an absence of synchronization and when the signal $z'_n$ indicates that the expression produced by the computing circuit 211 is to be stored, that is to say, when the real part of the received sample is higher than the real parts of the absolute values of the points of the constellation.

The memory 213 applies the most recently stored value to the summing circuit 214 which receives also the most recently stored value of the memory of the sub-assembly B.

In the embodiment described with reference to FIG. 6, the synchronization detector 22 comprises a first circuit 230 for computing a mean value of the error given by, for example, the following expression:

$$\mu = \Sigma |e'_n| + |e''_n|$$

The output of this computing circuit 230 is fed to the input of a digital/analog converter 231 whose output is connected to the input of a low-pass filter 232. The result obtained is applied to the input of a comparator 234. The output of this comparator forms the data S fed to the check circuit 212.

The results obtained in this embodiment are shown by the curve C of FIG. 5. The correction made to the local clock is considerably higher than that obtained with the curves A and B.

Needless to observe that variants may be made to the embodiments which have just been described, notably by substituting equivalent technical means, without the scope of the present invention being departed from. More particularly, the constellations used may be different from those used in the description, and other simplifications may be made to the expression of the pseudo-error.

I claim:

1. A digital communication system including a transmitter and a receiver and wherein digital signal samples ($x_n$) are transmitted in modulated form based on a first constellation of modulated sample values; characterized in that said receiver comprises:

sampling means for demodulating received modulated digital signal samples to recover received digital signal samples ($x_n$);

error calculating means for assigning decision values to recovered digital samples and deriving pseudo-error values ($\tilde{e}_n$) from variation between said decision values and said sample values; and phase comparator means for deriving from said pseudo-error values an adjustment error ($\in_n$) applicable to a control loop formed by feedback means for supplying to said sampling means a synchronizing signal timed in accordance with the adjustment error produced by said phase comparator means;

said error calculating means being adapted to derive said pseudo-error value $\tilde{e}_n$ by
  (i) deriving a first error ($e_n$) as a function of the distance between a received sample value and a first decision value corresponding thereto in said first constellation;
  (ii) deriving a second error ($\hat{e}_n$) as a function of the distance between a received sample value and a second decision value corresponding thereto in a second constellation, said second constellation being a simplified form of said first constellation; and
  (iii) forming said pseudo-error value ($\tilde{e}_n$) as a weighted combination of said first error and said second error, the weighting of said second error being proportional to said first error.

2. A digital communication system as claimed in claim 1, wherein said weighted combination has a value equal to said first error when said first error is below a predetermined threshold, and has a value equal to said second error when said first error is at or above said threshold.

3. A digital communication system as claimed in claim 1, wherein the digital signal samples and said first and second error values are complex in form, and said weighted combination is equal to a sign function of said first error value when said first error value is below a predetermined threshold, and is equal to a sign function of said second error value when said first error value is at or above said threshold.

4. A digital communication system as claimed in claim 1, wherein said receiver further comprises:
  synchronization detecting means for producing a synchronization detection signal when the receiver is not yet synchronized with received digital signal samples;
  storage means coupled to said synchronization detecting means for storing coordinates of said adjustment error ($\in_n$);
  calculating means comprised in said phase comparator means for generating said adjustment error based on coordinates thereof stored in said storage means; and
  check means coupled to said storage means and to said synchronization detecting means for enabling said storage means to store coordinates of an adjustment error when (i) the coordinates of a received digital sample corresponding to said error are outside the boundaries of said first constellation, and (ii) said synchronization detection signal is being produced by said synchronization detecting means.

* * * * *